F. Oakley,
Egg-Beater,
№ 61,679. Patented Jan. 29, 1867.

Witnesses;
Theo Tusch
J. A. Service

Inventor;
Fred. Oakley
Per Munn & Co.
Attorneys

United States Patent Office.

FREDERICK OAKLEY, OF LONDON, ENGLAND, ASSIGNOR TO HIMSELF AND JOHN WILLS, OF NEWARK, NEW JERSEY.

*Letters Patent No. 61,679, dated January 29, 1867.*

IMPROVED EGG AND CREAM BEATER.

*The Schedule referred to in these Letters Patent and making part of the same.*

TO ALL WHOM IT MAY CONCERN:

Be it known that I, F. OAKLEY, of London, England, have invented a new and improved Egg and Cream Beater; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
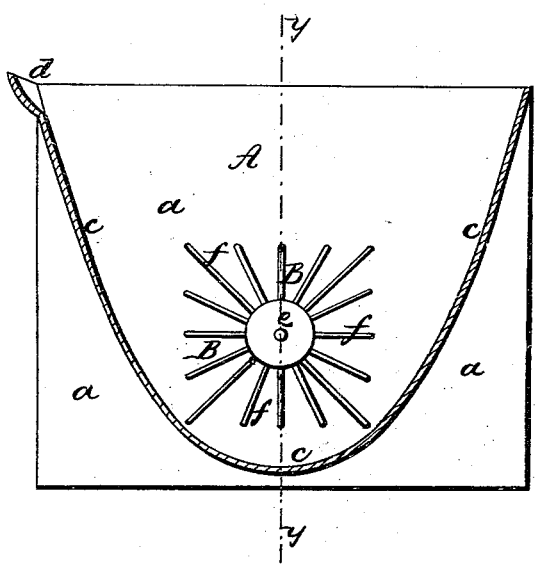
Figure 1 represents a vertical longitudinal section of my improved egg and cream beater, taken on the line $x\ x$, fig. 2.
Figure 2:
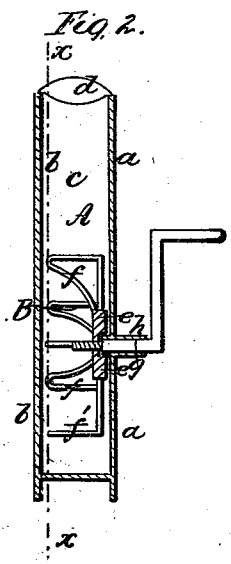
Figure 2 is a vertical cross-section of the same, taken on the line $y\ y$, fig. 1.

This improvement relates to a device by which eggs and cream can be beaten with the greatest despatch and ease, and which is easily cleaned, and not liable to get out of order. My invention consists in placing a wire beater into a metal or porcelain box, the side walls of which box are parallel, while its edges and bottom form a continuous half oval-shaped curve; and my invention also consists in the construction of the wire beaters, which are so made that when placed into the above-mentioned box they will very quickly perform the required service, while they may be easily removed for cleaning and other purposes. This invention is very useful for making jellies, blanc manges, and other articles of confectionery. The box A, which may be made of sheet metal, porcelain, or any other suitable material, consists of the parallel sides $a$ and $b$, and the curved edge and bottom wall $c$, the latter forming a continuous curve, as shown in fig. 1. The box rests upon the prolonged sides $a$ and $b$, as shown. Any fluid may be easily removed from it, as there are no sharp corners to retain any particles of the contents. A spout, $d$, at one end of the curved bottom $c$, facilitates the pouring out of the contents. The beater B consists of a small disk $e$, to which are attached radially the wire beaters $f$ in such a manner that their ends fall into the outline of a square, or nearly so, said square concentrating around the shaft $g$ to which the disk $e$ is secured. It will be seen that the beaters are not of equal length, but that the four which fall into the angles of the square are longest, and those in the centre of each line shortest. Thus the beater will strike the egg or cream in different places, and will confine most of the contents at the bottom of the box, between two of the long radial arms. The contents are consequently well beaten, and are still prevented from being spattered about too much. The wire arms $f$ project from the edge of the disk at right angles, and are then, at the proper point, bent forward at right angles again; that would be enough for beating eggs only, and such an arm, $f'$, is shown in fig. 2. But for beating cream, jelly, &c., it is preferable to continue the wire and return its end in a curve of any desired shape to the disk again, as shown (sub $f$) in fig. 2. The disk $e$ is hung upon the crank-shaft $g$. The said shaft is placed through a tube, $h$, which is attached to the side $a$ of the box A, and the shaft is then screwed into the disk $e$, as shown in fig. 2. The tube $h$ is for the purpose of preventing any of the contents from being thrown out through any small opening around the shaft $g$, for which purpose also that part of the shaft which is screwed into the disk is of smaller diameter than that passing through the tube, forming a shoulder which effectually prevents the escape of the contents at that place.

Having thus described my invention, I claim as new, and desire to secure by Letters Patent—

1. The combination of the case A, having the spout $d$ and the disk $e$, with triangular beaters B, of unequal length, as and for the purpose specified.

2. The case A, having the tube $h$ bearing the shaft $g$, to which the beater disk $e$ is secured, and supporting the shaft independent of any other bearing, in the manner as and for the purpose specified.

The above specification of my invention signed by me this 2d day of September, 1866.

FREDERICK OAKLEY.

Witnesses:
WM. F. McNAMARA,
ALEX. F. ROBERTS,